_United States Patent Office_

3,186,969
Patented June 1, 1965

3,186,969
VICINAL EPOXIDE ADDUCTS OF PHENOL-ARO-
MATIC AMINE-FORMALDHYDE CONDENSA-
TION PRODUCTS
Eugene F. Cox, Charleston, William H. Cook, South
Charleston, and Fritz Hostettler, Charleston, W. Va.,
assignors to Union Carbide Corporation, a corporation
of New York
No Drawing. Filed Oct. 9, 1961, Ser. No. 143,580
15 Claims. (Cl. 260—51.5)

The invention relates to a new class of polyols which comprise the vicinal epoxide adducts of phenol-aromatic amine-aldehyde condensation products.

It is known to condense vicinal epoxides with various reactive hydrogen-containing compounds, which are called "starters," to produce monohydric or polyhydric alcohols. In many applications, for example, in preparation of rigid polyurethane foams, it is desirable that such vicinal epoxide adducts contain three or more hydroxyl groups per molecule. It has also been found that it is desirable to employ as starters compositions which contain aromatic ring structures, in order to utilize the greater rigidity and improved heat distortion characteristics that is inherent in aromatic compositions. Accordingly, novolac resins and aromatic diamines have been employed as starters for producing vicinal epoxide adducts. However, novolacs have several disadvantages, such as non-reproducibility and the fact that novolacs have a wide molecular weight distribution. As a result, if the content of bisphenols (which have only two hydroxyl groups) is kept to a minimum, the average molecular weight of the novolac will be so high that its viscosity interferes with further processing. The aromatic diamines are relatively expensive compositions, and are limited in their functionality to four, since they possess only four reactive hydrogen atoms.

The present invention is based upon the discovery that highly useful vicinal epoxide adducts can be prepared from phenol-aromatic amine-aldehyde condensation products which are less expensive than aromatic diamines and which do not have the processing difficulties exhibited by novolac resins. Accordingly, the invention provides a novel class of polyols which comprises the vicinal epoxide adducts of the uncatalyzed condensation product of (a) A phenol which has at least one unsubstituted reactive position on the aromatic nucleus,
(b) An aromatic amine which has the formula $ArNH_2$ wherein Ar represents an aryl radical having at least one unsubstituted reactive position on the aromatic nucleus, and
(c) An aldehyde.

The polyols of the invention are prepared by reacting one or more vicinal epoxides with a phenol-aromatic amine-aldehyde condensation product, under conditions fully described hereinbelow at a more appropriate section of the specification, and recovering the polyol thereby produced.

The phenol-aromatic amine-aldehyde condensation products employed as starters in the production of the inventive polyols are prepared by the uncatalyzed reaction of a phenol, an aromatic amine, and an aldehyde. This condensation reaction can apparently proceed by several routes, one of which is the initial reaction of the aldehyde with the aromatic amine to produce an N-(1-hydroxyalkyl)aromatic amine, which in turn condenses with the phenol. This product then rearranges to form an aminoarylhydroxyarylalkane. The following sequence of reactions between formaldehyde, aniline, and phenol, is illustrative:

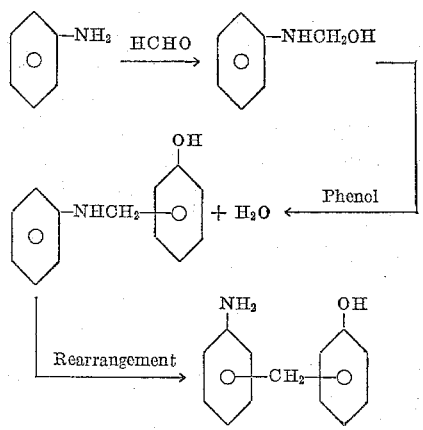

The amino group is thus freed to react with additional formaldehyde, and the sequence of reactions is continued. By proper adjustment of the reaction conditions, the molecular structure of the condensation products can be controlled within readily reproducible limits, which permits a high degree of batch-to-batch uniformity. The absence of any catalyst, such as the acid catalysts which are employed in making novolacs or the basic catalysts which are employed in making resoles, prevents any significant amount of side reactions from occurring, such as condensation between the aldehyde and the phenol.

The phenols which can be employed to produce the condensation products are the phenols which have at least one unsubstituted reactive position on the aromatic nucleus. It is normally the case that the reactive positions on the aromatic nucleus are those which are ortho and para to the hydroxyl group. Therefore, phenols which have at least one unsubstituted position ortho or para to the hydroxyl group are particularly useful. The phenols which can be employed include, among others, phenol, the alkylphenols, the halophenols, the alkoxyphenols, the dialkylaminophenols, the dihydroxybenzenes, and the like, which have at least one unsubstituted reactive position on the aromatic nucleus. Specific examples of phenols which can be employed include, among others, phenol, o-, m-, and p-cresol, o-, m-, and p-ethylphenol, o-, m-, and p-propylphenol, para-t-butylphenol and other butyl phenols, the pentylphenols, the hexylphenols, the heptylphenols, the octylphenols, the nonylphenols, the decylphenols, the dodecylphenols, the pentadecylphenols, the octadecylphenols, the dimethylphenols, the diethylphenols, the dipropylphenols, the dibutylphenols, the di-dodecylphenols, cresylic acid and other mixtures of alkylphenols, chlorophenols, the dichlorophenols, bromophenols, the dibromophenols, o-, m-, and p-methoxyphenol, o-, m-, and p-ethoxyphenol, o-, m-, and p-butoxyphenol, o-, m-, and p-N,N-dimethylaminophenol, resorcinol, catechol, phloroglucinol and other trihydroxybenzenes, naphthols, dihydroxynaphthalenes, bisphenol A and other bisphenols, aminophenols, trihydroxybiphenyl and other hydroxybiphenyls, and the like. The preferred phenols are phenol, the chlorophenols, and the alkylphenols wherein the alkyl groups thereof have from 1 to 18 carbon atoms, and most preferably, from 1 to 6 carbon atoms.

The aromatic amines which can be employed are those which are represented by the formula $ArNH_2$ wherein Ar is an aryl group which has at least one unsubstituted reactive position on the aromatic nucleus. Ordinarily, the reactive positions are those which are ortho and para to the amino group. Accordingly, aromatic amines which have at least one unsubstituted position ortho or para to the amino group are highly desirable for use in preparing the condensation products employed in the invention. Among the aromatic amines which can be employed are aniline, benzenediamines, alkyl-substituted anilines, alkyl-substituted benzenediamines, N-alkylaminoanilines, and the like. Specific examples of aromatic amines which can be employed include, among others, aniline; m-, and p-benzenediamine; o-, m-, and p-toluidine; o-, m-, and p-ethylaniline; o-, m-, and p-butylaniline; 2,3-xylidine and other xylidines; 2,4- and 2,6-diaminotoluene and other diaminotoluenes; 1-ethyl-2,4-diaminobenzene; 1-propyl-2,4-diaminobenzene; 1-butyl-2,4-diaminobenzene; o-, and p-dimethylaminoaniline; o- and p-diethylaminoaniline; alpha-naphthylamine and other mono- and polyaminonaphthalenes; the aminophenols; the chloroanilines and bromoanilines; and the like. The preferred aromatic amines are aniline, the alkyl-substituted anilines wherein the alkyl groups thereof have from 1 to 4 carbon atoms, and the alkyl-substituted diaminobenzenes wherein the alkyl groups thereof have from 1 to 4 carbon atoms.

The aldehydes which can be employed include, among others, the alkanals such as formaldehyde, acetaldehyde, propionaldehyde and the like, and other aldehydes such as chloral. Formaldehyde is preferred. The formaldehyde can be employed in water solution or in an organic solvent such as methanol. It is preferred to employ the formaldehyde in aqueous solution (such as the 37 weight percent aqueous solution known as formalin) and in solution in methanol.

The proportion of the reactants employed to prepare the phenol-aromatic amine-aldehyde condensation products is not necessarily a critical feature of the invention, and can be varied over a wide range. For example, for phenol and aniline themselves, the phenol-aromatic amine molar ratio can be varied from about 15:1, and higher, to about 1:15, and lower. A desirable molar ratio of phenol-aromatic amine is between about 9:1 and 1:9. The preferred molar ratio of phenol-aromatic amine is in the range of from about 6:1 to about 1:6, and most preferably, from about 3:1 to about 1:3. When substituted and polyfunctional phenols and aromatic amines are employed, the ratios may vary somewhat from those indicated above. The molar ratio of (phenol+aromatic amine):aldehyde can be varied from about 20:1, and higher, to about 1:1, and lower. The preferred molar ratio of (phenol+aromatic amine):aldehyde is from about 6:1 to about 1.2:1, and most preferably, from about 4:1 to about 1.4:1. Again, when substituted and polyfunctional phenols and aromatic amines are employed, the ratio may vary somewhat from those indicated.

The preferred phenol-aromatic amine-aldehyde condensation products are those which are permanently fusible. The preparation of the permanently fusible condensation products is dependent chiefly upon the amount of aldehyde employed. As a guide, it has been found that when the molar ratio of (phenol+aromatic amine):aldehyde is smaller than about 1.2:1, it becomes increasingly difficult to avoid residual reactivity which promotes crosslinking of the condensation products. Although the condensation products which are crosslinked, i.e., not permanently fusible, can be employed in the invention, the processing advantages attendant with the use of a permanently fusible condensation product are apparent, and for that reason, the permanently fusible condensation products are preferred.

The preferred method for carrying out the condensation reaction is to add the aldehyde slowly to an agitated mixture of phenol and aromatic amine, said mixture being maintained at a temperature of from about 50° C. to about 125° C., and preferably from about 70° C. to about 100° C., during the addition. After the addition of aldehyde, which can take from about 30 minutes to about 20 hours or longer, the condensation reaction is continued for from about 15 minutes to about 2 hours at a reaction temperature of from about 50° C. to about 130° C., and preferably, from about 70° C. to about 100° C. At the end of the reaction period, the condensation product can then be recovered by stripping off water, unreacted reagents, and any solvents that may be present, by heating to about 160° C.–200° C. and thereafter reducing the pressure.

Conventional equipment can be employed for the condensation reaction. For example, a reaction kettle equipped with agitator, means for reflux and distillation, nitrogen inlet means, and conventional heat transfer means, is suitable. The material of construction can be steel, stainless steel, glass, copper, Monel, and the like.

The condensation products described above are employed as "starters" to produce the polyols of the invention, by reacting said condensation products with one or more vicinal epoxides. The vicinal epoxides which can be employed include, for example, the alkylene oxides, the aryl glycidyl ethers, the aryl-substituted alkylene oxides, the cycloalkylene oxides, the halogen-substituted alkylene oxides, and the like, which preferably have from 2 to 10 carbon atoms. Specific examples of vicinal epoxides which can be employed include, among others, ethylene oxide; 1,2-epoxypropane; 1,2-epoxybutane, 2,3-epoxybutane; 2-methyl-1,2-epoxypropane; the epoxypentanes; the epoxyhexanes; the epoxyheptanes; the epoxyoctanes; the epoxydecanes; phenyl glycidyl ether; tolyl glycidyl ether; ethylphenyl gylcidyl ether; propylphenyl glycidly ether; butylphenyl glycidyl ether; styrene oxide; 1,2-epoxycyclohexane; 1,2-epoxycyclopentane; 2,3-epoxybicyclo[2.2.1]heptane; 3-chloro-1,2-epoxypropane; and the like. The preferred vicinal epoxides are the alkylene oxides such as ethylene oxide, 1,2-epoxypropane, and the epoxybutanes.

The polyols of the invention are prepared by reacting a vicinal epoxide with a phenol-aromatic aminealdehyde condensation product. The epoxide reacts with the phenolic hydroxyl groups and with the primary or secondary amino groups which are present in the condensation product, to form substituted or unsubstituted oxyalkylene chains of varying lengths, wherein each chain is connected to the condensation product through a phenolic oxygen atom or through an aromatic amino nitrogen atom at one end, and wherein each chain is terminated by a hydroxyl group at the other end. The addition reaction can be carried out in an inert organic vehicle, but is preferably carried out by slowly adding the epoxide to an agitated batch of fused phenol-aromatic amine-aldehyde condensation product. The reaction temperature can vary over a wide range, for example, from about 100° C. to about 220° C., and preferably from about 130° C. to about 190° C. The reaction time is dependent, in part, upon several factors, such as temperature, nature and proportion of reagents, and the like. Therefore, the reaction time can vary over a wide range, for example, from about 30 minutes to about 20 hours, and longer, and preferably from about 1 hour to about 10 hours. A limited amount of vicinal epoxide will add to some of the phenolic hydroxyl groups of the condensation products without employing a catalyst. Although it varies with the nature of the particular reagents employed, up to about 1.0 mole of vicinal epoxide per equivalent of phenolic hydroxyl groups contained in the condensation product will add without the use of a catalyst. Additional vicinal epoxide can then be added by employing a catalyst, for example, alkali metal and alkaline earth metal hydroxides or alkoxides such as sodium hydroxide, potassium hydroxide, calcium hydroxide, barium hydroxide; tertiary aliphatic amines such as trimethylamine, triethylamine, N,N,N',N'-tetramethyl-1, 3-butanediamine, triethylenediamine; quaternary ammonium or phosphonium hydroxides or alkoxides; and proton acids and Lewis acids. The catalyst is employed in an amount of from about 0.02 weight percent to about 1.0 weight percent or more, and preferably from about 0.05 to about 0.2 weight percent, based on total weight of reactants.

The proportion of the vicinal epoxide and the phenol-aromatic amine-aldehyde condensation product is not critical, and can vary widely. The amount of vicinal epoxide employed depends upon the length of the oxyalkylene chains that it is desired to build up. The chain length will be tailormade, depending upon the application intended for the polyol. Useful polyols can be prepared which have oxyalkylene chains which average from about 0.25, and lower, to about 30, and higher, oxyalkylene units per reactive hydrogen atoms contained in the phenol-aromatic amine-aldehyde condensation product. (The reactive hydrogens are the phenolic hydroxyl hydrogens and the aromatic amino hydrogens.) The preferred polyols have oxyalkylene chains which average from about 0.5 to about 10 oxyalkylene units, and more preferably from about 1 to about 2.5 oxyalkylene units per reactive hydrogen atoms contained in the phenol-aromatic amine-aldehyde condensation products. Accordingly, the proportion of the reagents can vary from about 0.25 mole, and less, to about 30 moles, and more, of vicinal epoxide per equivalent of reactive hydrogen atoms contained in the phenol-aromatic amine-aldehyde condensation product. The preferred proportion is from about 0.5 to about 10 moles of vicinal epoxide per equivalent of reactive hydrogen atoms contained in the condensation product. The most highly preferred proportion of reagents is from about 1 to about 2.5 moles of vicinal epoxide per equivalent of reactive hydrogen atoms contained in the phenol-aromatic amine-aldehyde condensation product.

After the reaction of vicinal epoxide with phenol-aromatic amine-aldehyde condensation product, the polyol product can be recovered by conventional methods. For example, a suitable method of recovery is to dilute the polyol with an inert organic vehicle, for example methanol, and to pass the diluted polyol through an ion exchange resin to remove any catalyst that was employed for the epoxide addition reaction. The inert organic vehicle can then be stripped off, along with any unreacted epoxide that might be present, thereby recovering the polyol product.

Conventional reaction equipment can be employed for the epoxide addition reaction. If desired, the same equipment employed for the preparation of the phenol-aromatic amine-aldehyde condensation product can be utilized for the epoxide addition reaction. The pressure under which the reaction is conducted is not critical, and it can be atmospheric, subatmospheric, or superatmospheric.

The polyols of the invention are widely useful compositions. For example, they can be employed as coreactants with organic polyisocyanates in the preparation of polyurethane foamed reaction products and other urethane products such as adhesives and coatings. The polyols can be reacted with drying oil acids by known methods to prepare esters having utility as surface coatings. The long chain alkylene oxide adducts can be employed as surfactants. The polyols can further be employed as hardeners for polyepoxide resins in the preparation of molded articles, laminates, cast articles, and the like. Other uses include the preparation of association reaction products with polyethers such as polyoxyethylene, preparation of ion-exchange resins and chelating agents, and the like.

The examples which follow illustrate the practice of the invention.

EXAMPLE 1

*Preparation of phenol-aromatic amine-formaldehyde condensation product*

A mixture of 1000 grams (10.62 moles) of phenol and 990 grams (10.62 moles) of aniline was heated to 95° C. under a nitrogen atmosphere in a 5000 milliliter, 4-neck Pyrex reaction flask that was equipped with stirrer, thermometer, dropping funnel, and reflux condenser. Over a 45-minute period, 1105 grams (11.8 moles) of 37 weight percent aqueous formaldehyde solution was added to the reaction mixture while stirring vigorously. A mild exotherm occurred during the addition of formaldehyde. The reaction mixture was refluxed for one hour at about 102° C., and was then distilled to a pot temperature of 180° C. at atmospheric pressure. These conditions were maintained for 30 minutes, after which time the pressure was reduced to an absolute pressure of 3 millimeters of mercury. The distillation was continued for ten minutes at 3 millimeters of mercury pressure and 180° C. The resulting condensation product was a clear, brittle, glass-like solid at room temperature. The distillate had two phases and contained only water, phenol, aniline, and a trace of formaldehyde.

The following analytical procedures and calculations were employed to characterize the condensation products and the vicinal epoxide adducts prepared therefrom:

Conversion of starting materials to
condensation product, per batch =

$$\frac{\text{Weight of condensation product}}{\text{Total weight of starting materials}}$$

Amino+phenoxyl equivalent weight—Analogous to hydroxyl number determination (acetic anhydride in pyridine, 30 minutes at room temperature)

Average molecular weight—"Thermometric" method, in acetone, ethanol, or chloroform.

Active hydrogen equivalent weight
of condensation product =

$$\frac{(\text{OH equivalent weight of epoxide adduct}) \times (\text{weight of condensation product})}{\text{Weight of epoxide adduct}}$$

Basic nitrogen analysis—Titration with perchloric acid in glacial acetic acid

Ratio, aniline residues per phenol residues in condensation product =

$$\frac{(\text{Percent N}) (\text{amino+phenoxyl equivalent weight})}{1401-(\text{percent N})(\text{amino+phenoxyl equivalent weight})}$$

(This formula is employed only when monohydric phenols and monoamino aromatic amines are employed.)

Average active hydrogen functionality =

$$\frac{\left[\text{molecular weight+12 of condensation product}\right][2(ArNH_2/ArOH \text{ ratio})+1]}{(ArNH_2/ArOH \text{ ratio})(12+\text{molecular weight } ArNH_2)+(\text{molecular weight } ArOH+12)}$$

(This formula applicable only when condensation product is prepared from monohydric phenols and monoamino aromatic amines.)

Average polyether
chain length =

$$\frac{(\text{OH equivalent weight of epoxide adduct}) - (\text{active H equivalent weight of condensation product})}{\text{Molecular weight of epoxide}}$$

EXAMPLES 2–11

Following the same general procedure described in Example 1, a series of condensation products were prepared from phenol, aniline, and formaldehyde. Table I below, describes each condensation product and reports the analytical results obtained for each example.

TABLE I.—ANALYTICAL RESULTS: CONDENSATION PRODUCTS OF PHENOL, ANILINE, FORMALDEHYDE

| Example | 1 | 2 | 3 | 4 | 5 | 6 | 7 | 8 | 9 | 10 | 11 |
|---|---|---|---|---|---|---|---|---|---|---|---|
| Molar ratio of reactants phenol/aniline/formaldehyde | 1/1/1.28 | 1/1/1.3 | 2/1/1.25 | 8/8/1 | 8/1/2 | 8/1/3 | 1/8/2 | 3/3/1 | 2/2/1 | 1.3/1.3/1 | 1/3/2 |
| Percent conversion of starting materials to condensation product, per batch | 55 | 56 | | 12.5 | 36 | 35 | 25 | 27 | 35 | 46 | 52 |
| Active hydrogen, equivalent weight | 67.2 | 67.8 | 71.3 | 68.2 | 81.8 | 81.3 | 63.5 | 63.6 | 67.7 | 62.6 | 62.0 |
| Equivalent weight, amino plus phenoxyl groups | 108.8 | 117.8 | 105.8 | 99.8 | 111.4 | 114.7 | 106.9 | 99.7 | 101.8 | 101.1 | 106.0 |
| Ratio, aniline residues per phenol residue | 1.08 | 0.994 | 0.899 | 1.02 | 0.433 | 0.396 | 1.80 | 1.05 | 1.15 | 1.28 | 2.57 |
| Basic nitrogen, weight percent | 6.68 | 5.93 | 6.27 | 7.07 | 3.80 | 3.47 | 8.43 | 7.19 | 7.37 | 7.79 | 9.51 |
| Total nitrogen, weight percent | 6.85 | 5.75 | 6.30 | 6.70 | 3.98 | 3.46 | 8.01 | 7.05 | 7.39 | 7.84 | 9.56 |
| Molecular weight of condensation product | 491 | 474 | 335 | 200 | 361 | 450 | 496 | 255 | 284 | 327 | 382 |
| Average active hydrogen functionality | 7.2 | 6.9 | 4.8 | 3.0 | 4.6 | 5.6 | 7.9 | 3.8 | 4.3 | 5.0 | 6.4 |

EXAMPLES 12–20

In these experiments, various phenols and aromatic amines were employed to prepare condensation products by the same general procedure described in Example 1. Table II identifies the nature and proportion of the reagents employed in each example, and Table III details the analytical results obtained for each example.

TABLE II.—IDENTIFICATION OF PHENOL-AROMATIC AMINE-FORMALDEHYDE CONDENSATION PRODUCTS

| Example | 12 | 13 | 14 | 15 | 16 | 17 | 18 | 19 | 20 |
|---|---|---|---|---|---|---|---|---|---|
| Molar ratio of phenol/aromatic amine/formaldehyde | 1/6/2 | 6/1/2 | 1/1/1.3 | 1/4.5/1.5 | 5/1/1 | 1/1/1 | 1/1/1 | x/3/1 [2] | 1/1/1 |
| Identification of phenol | Koppers [1] Type BC cresylic acid. | Koppers [1] Type BC cresylic acid. | Koppers [1] Type BC cresylic acid. | Para-chlorophenol. | Phenol. | Phenol. | Phenol. | Midland [3] tar cresylic acid. | Para-t-butylphenol. |
| Identification of aromatic amine. | Aniline. | Aniline. | Aniline. | Aniline. | 2,4-diaminotoluene. | o-Toluidine. | p-Toluidine. | Aniline. | p-Toluidine. |

[1] A mixture of $C_1$–$C_3$ alkyl-substituted phenols having an average molecular weight of 112, and having the following analysis:

Vapor phase analysis, weight percent

"Light Ends" — 0
Phenol — 4.8
O-cresol+2,6-xylenol — 10.9
m,p-Cresol+o-ethylphenol — 46.9
2,4- and 2,5-xylenol — 16.0
3,5- and 2,3-xylenol+m,p-ethylphenol — 14.6
3,4-xylenol+m,p-isopropylphenol — 4.7
2 3,5-trimethylphenol — 2.0
2,4,6-trimethylphenol+o-isopropylphenol — 0

[2] $3 > x > 2$.
[3] A mixture of $C_1$–$C_4$ alkyl-substituted phenols.

TABLE III.—ANALYTICAL RESULTS: PHENOL-AROMATIC AMINE-FORMALDEHYDE CONDENSATION PRODUCTS

| Example | 12 | 13 | 14 | 15 | 16 | 17 | 18 | 19 | 20 |
|---|---|---|---|---|---|---|---|---|---|
| Percent conversion of starting material to condensation product per batch | 34 | 36 | 58 | 38 | 31 | 57 | 53 | 31 | 59 |
| Active hydrogen, equivalent weight | 65.2 | 91.1 | 75.1 | 61.3 | 45.7 | 70.0 | 33.0 | 90.7 | 92.3 |
| Equivalent weight, amino plus phenoxyl groups | 114.7 | 130.0 | 119.6 | 111.9 | 84.5 | 110.3 | 115.2 | 156.0 | 140.9 |
| Ratio, aromatic amine residues per phenol residue | 2.49 | 0.542 | 1.14 | 3.15 | 1.35 | 1.16 | 1.09 | ([1]) | 0.964 |
| Basic nitrogen, weight percent | 8.71 | 3.79 | 6.25 | 9.50 | | 6.83 | 6.35 | 4.29 | 4.88 |
| Total nitrogen, weight percent | 8.64 | 3.65 | 6.31 | 9.79 | 12.09 | 6.70 | 6.37 | 3.84 | 4.84 |
| Molecular weight of condensation product | 519 | 424 | | 302 | 317 | 426 | 413 | | 440 |
| Average active hydrogen functionality | 8.2 | 5.0 | | 4.9 | 7.3 | 6.0 | 5.7 | | 4.8 |

[1] About 0.91.

EXAMPLE 21

*Preparation of vicinal epoxide adduct of phenol-aromatic amine-formaldehyde condensation product*

Propylene oxide (1103 grams, 19.5 moles) was added to 165.2 grams of the condensation product of Example 1. The addition was carried out by adding the propylene oxide to a stirred, fused batch of the condensation product which was maintained at 160° C. to 190° C. The addition took about 5 hours. At the end of this time, the addition of propylene oxide without catalyst had ceased, so 2.75 grams of potassium hydroxide was added to the reaction mixture, and 1833 more grams (31.6 moles) of propylene oxide was added to the reaction mixture. During the second addition of propylene oxide, which took about 8 hours, the reaction temperature was maintained at 130° C. to 180° C. After cooling, the polyol product was diluted with methanol to lower the viscosity, and was then passed through a column of strong acid ion-exchange resin to remove the potassium hydroxide catalyst. The pH of the eluate was 6.2. The product was stripped to a final temperature and absolute pressure of 180° C. and 1–3 millimeters of mercury. The polyol had a hydroxyl number of 306, which corresponds (according to the known active hydrogen equivalent weight of the original condensation product) to an average polyoxyalkylene chain length of 1.98 oxypropylene units.

EXAMPLES 22–46

Propylene oxide adducts were prepared from each of the condensation products prepared in Examples 2–20. The method of preparation was the same general procedure described in Example 21. Table IV tabulates the hydroxyl numbers and average length of oxyalkylene chains for each polyol.

TABLE IV.—DESCRIPTION OF PROPYLENE OXIDE ADDUCTS OF PHENOL-AROMATIC AMINE-FORMALDEHYDE CONDENSATION PRODUCTS

| Example | Example No. of condensation product | Hydroxyl Number | Average length of Oxyalkylene chain |
|---|---|---|---|
| 22 | 2 | 342 | 1.66 |
| 23 | 3 | 232 | 3.04 |
| 24 | 4 | 344 | 1.63 |
| 25 | 5 | 290 | 1.92 |
| 26 | 6 | 320 | 1.82 |
| 27 | 7 | 333 | 1.81 |
| 28 | 8 | 356 | 1.62 |
| 29 | 9 | 357 | 1.54 |
| 30 | 9 | 337 | 1.71 |
| 31 | 9 | 319 | 1.86 |
| 32 | 10 | 442 | 1.11 |
| 33 | 10 | 352 | 1.67 |
| 34 | 11 | 325 | 1.90 |
| 35 | 11 | 340 | 1.78 |
| 36 | 12 | 314 | 1.96 |
| 37 | 13 | 287 | 1.80 |
| 38 | 14 | 326 | 1.67 |
| 39 | 15 | 348 | 1.73 |
| 40 | 16 | 377 | 1.78 |
| 41 | 17 | 317 | 1.84 |
| 42 | 18 | 307 | 1.89 |
| 43 | 18 | 339 | 1.60 |
| 44 | 19 | 330 | 1.36 |
| 45 | 20 | 424 | [1] 0.69 |
| 46 | 20 | 236 | 2.49 |

[1] This vicinal epoxide adduct was prepared without the use of a catalyst.

EXAMPLE 47

The ethylene oxide adduct of the phenol-aromatic amine-formaldehyde condensation product of Example 2 was prepared having an average oxyethylene chain length of 0.99. The method of preparation was by the same general procedure described in Example 21, except that no catalyst was used. The polyol product was then "capped" with propylene oxide to give a polyol that had a hydroxyl number of 375 and an average oxyalkylene chain length of 1.66 oxyalkylene units.

EXAMPLE 48

*Preparation of polyurethane foamed reaction product from the polyols of the invention*

A foamed reaction product was prepared from the following formulation:

140 grams of the polyol prepared in Example 21
73 grams of an 80/20 mixture of 2,4- and 2,6-tolylenediisocyanate
37 grams fluorotrichloromethane
1.2 grams of silicone surfactant "L-520" [1]
0.8 gram of dibutyltin dilaurate catalyst The foam was prepared by first blending the polyol with the fluorotrichloromethane by charging both materials to a polyethylene bottle, sealing the bottle, and immersing it in a 55° C. water bath for 30 minutes. The bottle was then rolled on a mechanical roller overnight (about 16 hours). The desired amount of polyol fluorotrichloromethane blend was then weighed into a stainless-steel beaker. The catalyst and surfactant were added to the beaker, and the mixture was stirred with a mechanical mixer. The tolylenediisocyanate was then added, and the mixture was stirred vigorously until thoroughly mixed, after which it was immediately poured into an 8 x 8 x 5 inch waxed stainless steel mold which had been preheated to 70° C. After the foam had risen completely, it was cured for 10 minutes at 70° C., removed from the mold,

[1] A polysiloxane-oxyalkylene block copolymer prepared in accordance with the disclosure in U.S. Patent No. 2,834,748.

and allowed to age for three days at room temperature before testing. The test results were as follows:

PROPERTIES OF FOAM SPECIMEN
Property:
  Cream time, sec. ___ 20
  Foam time, sec. ___ 65
  Tack time, sec. ___ 71
  Density, pounds/cubic foot ___ 2.1
  Percent closed cells ___ 91
Compressive strenghts, p.s.i.:
  23° C.—parallel to direction of foam rise ___ 48
  85° C.—parallel to direction of foam rise ___ 35
  100° C.—parallel to direction of foam rise ___ 33
  120° C.—parallel to direction of foam rise ___ 12
  23° C.—perpendicular to direction of foam rise ___ 19
  85° C.—perpendicular to direction of foam rise ___ 17
  100° C.—perpendicular to direction of foam rise ___ 14
  120° C.—perpendicular to direction of foam rise ___ 6
Percent change in volume at 100% relative humity and 70° C. (humid aging):
  1 week ___ 10
  2 weeks ___ 10
  4 weeks ___ 12
Percent change in volume at 70° C. and 5% relative humidity (dry aging): 2 weeks ___ 3
Percent change in volume at −25° F. (cold aging): 2 weeks ___ 0
Compressive strength, p.s.i. (parallel to direction of foam rise):
  Humid aged 4 weeks ___ 41
  Dry aged 2 weeks ___ 53
  Cold aged 2 weeks ___ 50
Percent weight increase:
  Humid aged—1 week ___ 2
    2 weeks ___ 0
    4 weeks ___ 1
  Dry aged 2 weeks ___ 0
  Cold aged 2 weeks ___ 0
Water vapor permeability parallel to foam rise—
  Perm, inches ___ 2.24
$k$-Factor, parallel, (B.t.u.) (inches thickness)/(hours) (feet)$^2$ (°F.):
  Initial ___ 0.132
  30-day ___ 0.163
  60-day ___ 0.172
$k$-Factor, perpendicular:
  Initial ___ 0.109
  30-day ___ 0.126
  60-day ___ 0.140

The preceding examples illustrate the practice of the invention. Variations can be made in accordance with the teachings of the instant specifications without departing from the spirit and scope of the invention.

What is claimed is:
1. A polyol which comprises the vicinal epoxide adduct of the uncatalyzed, ternary, permanently fusible, condensation product of
  (a) a phenol which has at least one unsubstituted reactive position on the aromatic nucleus,
  (b) an aromatic amine which has the formula $ArNH_2$ wherein Ar represents an aryl radical which has at least one unsubstituted reactive position on the aromatic nucleus, and
  (c) formaldehyde, wherein said vicinal epoxide is selected from the group consisting of the alkylene oxides, the aryl glycidyl ethers, the aryl-substituted alkylene oxides, the cycloalkylene oxides, and the halogen-substituted alkylene oxides.

2. A polyol which comprises the vicinal epoxide adduct of the uncatalzed, ternary, permanently fusible, condensation product of
   (a) an aromatic compound selected from the group consisting of phenol, the chlorophenols, and the alkylphenols, said aromatic compound having at least one unsubstituted reactive position on the aromatic nucleus,
   (b) an aromatic amine selected from the group consisting of aniline, the alkyl-substituted anilines wherein the alkyl groups thereof have from 1 to 4 carbon atoms, and the alkyl-substituted benzenediamines wherein the alkyl groups thereof have from 1 to 4 carbon atoms, said aromatic amine having at least one unsubstituted reactive position on the aromatic nucleus, and
   (c) formaldehyde, wherein said vicinal epoxide is selected from the group consisting of the alkylene oxides, the aryl glycidyl ethers, the aryl-substituted alkylene oxides, the cycloalkylene oxides, and the halogen-substituted alkylene oxides.

3. A polyol which comprises the vicinal epoxide adduct of the uncatalyzed, ternary, permanently fusible, condensation product of phenol, aniline, and formaldehyde, wherein said vicinal epoxide is selected from the group consisting of the alkylene oxides, the aryl glycidyl ethers, the aryl-substituted alkylene oxides, the cycloalkylene oxides, and the halogen-substituted alkylene oxides.

4. A polyol which comprises the alkylene oxide adduct of the uncatalyzed, ternary, permanently fusible, condensation product of
   (a) a phenol which has at least one unsubstituted reactive position on the aromatic nucleus,
   (b) an aromatic amine which has the formula $ArNH_2$ wherein Ar represents an aryl radical which has at least one unsubstituted reactive position on the aromatic nucleus, and
   (c) formaldehyde.

5. A polyol which comprises the alkylene oxide adduct of the uncatalyzed, ternary, permanently fusible, condensation product of
   (a) an aromatic compound selected from the group consisting of phenol, the chlorophenols, and the alkylphenols, said aromatic compound having at least one unsubstituted reactive position on the aromatic nucleous,
   (b) an aromatic amine selected from the group consisting of aniline, the alkyl-substituted anilines wherein the alkyl groups thereof have from 1 to 4 carbon atoms, and the alkyl-substituted benzenediamines wherein the alkyl groups thereof have from 1 to 4 carbon atoms, said aromatic amine having at least one unsubstituted reactive position on the aromatic nucleous, and
   (c) formaldehyde.

6. A polyol which comprises the alkylene oxide adduct of the uncatalyzed, ternary, permanently fusible, condensation product of phenol, aniline, and formaldehyde.

7. The polyol of claim 4, wherein said alkylene oxide is propylene oxide.

8. The polyol of claim 5, wherein said alkylene oxide is propylene oxide.

9. The polyol of claim 6, wherein said alkylene oxide is propylene oxide.

10. The polyol of claim 4, wherein said alkylene oxide is ethylene oxide.

11. The polyol of claim 5 wherein said alkylene oxide is ethylene oxide.

12. The polyol of claim 6 wherein said alkylene oxide is ethylene oxide.

13. The polyol of claim 4 wherein said alkylene oxide is a mixture of ethylene oxide and propylene oxide.

14. The polyol of claim 5 wherein said alkylene oxide is a mixture of ethylene oxide and propylene oxide.

15. The polyol of claim 6 wherein said alkylene oxide is a mixture of ethylene oxide and propylene oxide.

References Cited by the Examiner
UNITED STATES PATENTS
2,897,179  7/59  Schechter et al.

WILLIAM H. SHORT, Primary Examiner.
LOUISE P. QUAST, Examiner.